3,049,369
FASTENING DEVICE
Warren L. Trafton, Grosse Pointe, Mich., assignor to United-Carr Fastener Corporation, Cambridge, Mass., a corporation of Delaware
Filed Aug. 28, 1958, Ser. No. 757,721
1 Claim. (Cl. 287—20.5)

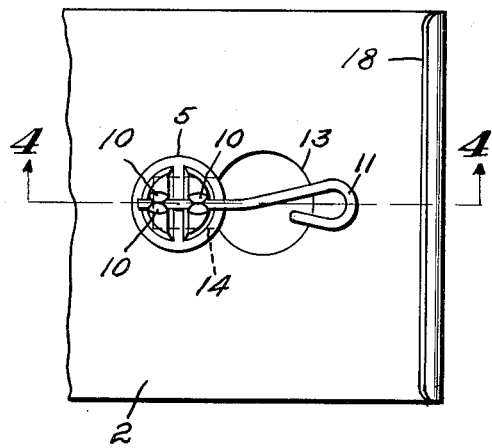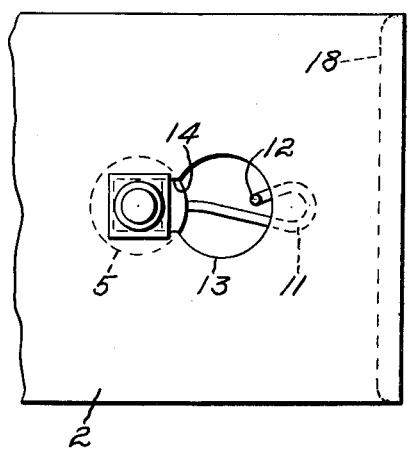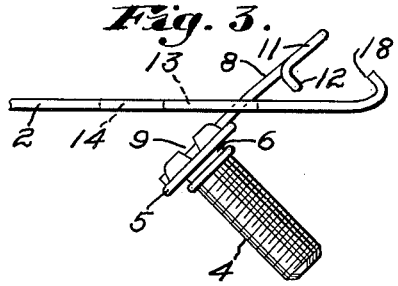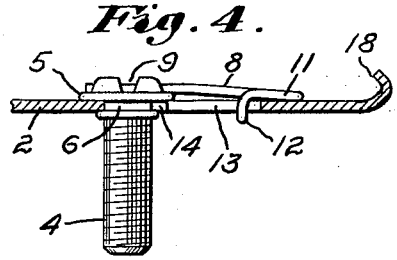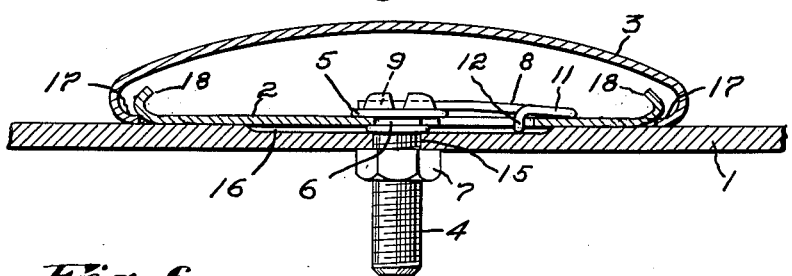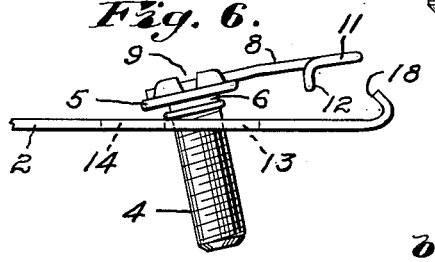
Inventor:
Warren L. Trafton,
by Walter S. Jones
Att'y.

My invention relates particularly to a fastener assembly and an improved fastening device adapted to be assembled to a support of an installation. The support has an aperture therethrough and a slot connecting to said aperture (forming a keyhole type of opening) the fastening device being so constructed and arranged as to be adapted to be assembled with a supporting plate from either side, at the opening.

An object of my invention is to provide an improved assembly of the type disclosed in the United States Letters Patent issued to William A. Bedford, Jr., number 2,704,680, March 22, 1955.

Another object of my invention is to provide a fastening device for the assembly that is constructed in such a manner that it may be assembled with a plate from either of two opposed sides providing the plate has a keyhole type of opening.

A further object of the invention is to simplify the fastening device so that it may be used with various assemblies and provide a somewhat universal fastener for manual attachment at any time either as a preassembly or at the time of complete final assembly.

Other objects of the invention will, in part, be obvious and will, in part, appear hereinafter.

In the drawing:

FIG. 1 is a top plan view of the complete assembly of the fastening device with a supporting plate;

FIG. 2 is a bottom plan view of FIG. 1;

FIG. 3 is an edge view of the parts shown in FIG. 1 but showing the fastening device during its assembly from the underside of the plate;

FIG. 4 is a section taken on the line 4—4 of FIG. 1;

FIG. 5 is a section of a complete assembly showing one use of my invention; and

FIG. 6 is an edge view similar to FIG. 3 but showing the fastening device in the act of being assembled from the top side of the plate.

Referring now to the particular embodiment of my invention illustrated by the drawings I have shown, in FIG. 5, one form of installation (or assembly) to which my invention applies. This assembly includes a basic support 1, a plate 2, a fastening device and a snap-on molding 3.

The fastening device may be of various types, such as snap fastener type, screw type, etc., my improvement in the fastener being mostly in the construction by which it is attached to the plate 2.

The specific fastening device illustrated has a threaded shank 4, a head 5, a groove 6 in the head, a nut 7 and an attaching member 8. The attaching member 8 may be secured to the rest of the fastener in any suitable manner but I prefer to form it of wire and attach one end in a groove 9 in the head 5 by swedging over portions 10 (FIG. 1). The attaching member 8 extends laterally from the head 5 and has its end portion bent into a loop 11, while the free end is bent in the direction of the shank to form a fastening device positioning portion 12.

To assemble the parts of the installation, I first attach the fastening device to the plate 2 by entering the attaching member through an opening 13 large enough for the head to pass. The head 5 is then entered into the opening 13 and the whole fastener is moved laterally to engage the groove 6, of the head, into a slot 14 connecting with the aperture 13. As the fastener is moved laterally, the positioning portion 12 snaps into the hole 13 and the fastener is finally locked into position so that it cannot be removed until the positioning portion 12 is raised from the hole 13 and the fastener moved laterally out of the slot 14. The shape of the head 5 at the groove 6 is preferably square to fit the slot 14 and prevent turning of the fastening device in the plate 2.

Now that the fastener is in place on the plate 2, the plate may be assembled to the support 1 by passing the shank 4 through an aperture 15 in the support and finally a nut is threaded onto the shank and tightened to the position shown in FIG. 5. It will be noted that I have provided a recess 16 in the support 1 so that portion of the head 5 and the end of the fastener device positioning portion 12 may enter therein and permit the plate 2 to lie flush against the support 1.

The assembly may be completed by snapping the inturned edges 17, of the molding 3, over the upstanding portions 18 formed on the plate 2, all as shown in FIG. 5.

In FIG. 6 I have shown the manner by which the fastening device may be applied to plate 2 from that side opposite to that side described above in connection with FIG. 3. This assembly is assomplished by inserting the shank 4 of the fastener through the hole 13, then sliding the fastener so that the groove 6 moves into the slot 14 until the positioning portion 12 snaps into the aperture 13.

While I have illustrated and described a preferred embodiment of my invention, it should be understood that my invention is best defined by the following claim.

I claim:

A fastener assembly of the class described comprising a support having an opening therein and a slot connecting to said opening, and a fastening device assembled with said support through said opening, said fastening device having a head and a shank, said head having a portion larger than the width of said slot disposed on, and directly engaging, one side of said support at said slot, and said shank extending through the slot and beyond said support beneath said head and an attaching member fixed directly to one side only of said head and extending from said head laterally over the aperture and over the support opposite said slot and having a fastening device positioning portion engaging the support to hold the device in assembled position and said head having an integral annular groove receiving a portion of said support adjacent to said slot thereby cooperating with a part of said head to hold the fastening device in position against axial displacement, and said groove spaced from said attaching member and formed between said shank and said attaching member.

References Cited in the file of this patent

UNITED STATES PATENTS

| | | |
|---|---|---|
| Re. 23,286 | Oliver | Oct. 17, 1950 |
| 2,159,573 | Tinnerman | May 23, 1939 |
| 2,266,832 | Tinnerman | Dec. 23, 1941 |
| 2,620,538 | Poupitch | Dec. 9, 1952 |
| 2,704,680 | Bedford | Mar. 22, 1955 |
| 2,713,186 | Borowsky | July 19, 1955 |
| 2,853,113 | Flora et al. | Sept. 23, 1958 |
| 2,879,569 | Poupitch | Mar. 31, 1959 |